(12) United States Patent
Powell et al.

(10) Patent No.: US 6,629,419 B1
(45) Date of Patent: Oct. 7, 2003

(54) CFC 12 REPLACEMENT REFRIGERANT

(75) Inventors: Richard L. Powell, Cheshire (GB); John Edward Poole, Cheshire (GB); John Derek Capper, Cheshire (GB); James Victor Thomas, Nova Scotia (CA)

(73) Assignee: Refringerant Products Ltd., Manchester (GB)

( * ) Notice: Subject to any disclaimer, the term of this patent is extended or adjusted under 35 U.S.C. 154(b) by 167 days.

(21) Appl. No.: 09/675,498

(22) Filed: Sep. 29, 2000

Related U.S. Application Data

(63) Continuation-in-part of application No. 09/570,829, filed on May 12, 2000, which is a continuation-in-part of application No. 09/565,186, filed on May 3, 2000, now abandoned.
(60) Provisional application No. 60/157,692, filed on Oct. 4, 1999.

(51) Int. Cl.⁷ ............................................... F25D 25/00
(52) U.S. Cl. ............................ 62/114; 62/114; 62/115; 62/119; 252/68
(58) Field of Search ............................... 252/68; 62/114, 62/115, 119

(56) References Cited

U.S. PATENT DOCUMENTS

| | | | |
|---|---|---|---|
| 4,138,855 A | 2/1979 | Jahan et al. | 62/112 |
| 4,198,313 A | 4/1980 | Bargigia et al. | 252/305 |
| 4,272,960 A | 6/1981 | Wahl, III | 60/641 D |
| 4,482,465 A | 11/1984 | Gray | 252/67 |
| 4,810,403 A | 3/1989 | Bivens et al. | 252/67 |
| 4,941,986 A | 7/1990 | Jolly | 252/51.5 R |
| 4,944,890 A | 7/1990 | Deeb et al. | 252/54 |
| 5,026,497 A | 6/1991 | Merchant | 252/171 |
| 5,080,823 A | 1/1992 | Arnaud et al. | 252/172 |
| 5,108,637 A | 4/1992 | Pearson | 252/67 |
| 5,182,040 A | 1/1993 | Bartlett et al. | 252/67 |
| 5,304,320 A | 4/1994 | Barthelemy et al. | 252/67 |
| 5,360,566 A | 11/1994 | Stevenson | 252/67 |
| 5,370,812 A | 12/1994 | Brown | 252/68 |
| 5,417,871 A | 5/1995 | Minor et al. | 252/67 |
| 5,425,890 A | 6/1995 | Yudin et al. | 252/67 |
| 5,458,798 A | 10/1995 | Lunger et al. | 252/67 |
| 5,622,644 A | 4/1997 | Stevenson et al. | 252/67 |
| 5,624,596 A * | 4/1997 | Lunger et al. | 252/68 |
| 5,626,790 A | 5/1997 | Minor | 252/67 |
| 5,672,293 A | 9/1997 | Minor et al. | 252/67 |
| 5,785,883 A | 7/1998 | Minor et al. | 252/67 |
| 6,106,740 A | 8/2000 | Powell et al. | 252/67 |
| 6,117,356 A | 9/2000 | Powell et al. | 252/67 |

FOREIGN PATENT DOCUMENTS

| | | | |
|---|---|---|---|
| DE | 41 16 274 C2 | 11/1992 | C09K/5/04 |
| EP | 0 430 169 B1 | 6/1991 | C09K/5/04 |
| EP | 0 430 169 A1 | 6/1991 | C09K/5/04 |
| EP | 0 509 673 A1 | 10/1992 | C09K/5/04 |
| EP | 0539 952 A1 * | 5/1993 | C09K/5/04 |
| EP | 0 539 952 A1 | 5/1993 | C09K/5/04 |
| EP | 0 608 164 A1 | 7/1994 | A62B/35/04 |
| EP | 0 659 862 B1 | 6/1995 | C09K/5/04 |
| EP | 0 659 862 A1 | 6/1995 | C09K/5/04 |
| EP | 0 565 265 B1 | 10/1995 | C09K/5/04 |
| EP | 0 720 639 B1 | 7/1996 | C09K/5/04 |
| JP | 07173462 A2 | 7/1995 | |
| JP | 08143696 A2 | 6/1996 | |
| JP | 08170074 A2 | 7/1996 | |
| JP | 04018484 A2 | 1/1999 | |
| JP | 11-181414 | 7/1999 | C09K/5/04 |
| WO | WO 92/11339 | 7/1992 | C09K/5/04 |
| WO | WO 92/16597 | 10/1992 | C09K/5/04 |
| WO | WO 94/26835 | 11/1994 | C09K/5/04 |
| WO | WO 95/08602 | 3/1995 | C09K/5/04 |
| WO | WO 96/03473 A1 | 2/1996 | C09K/5/04 |
| WO | 9707179 A1 | 2/1997 | |
| WO | WO 97/15637 | 5/1997 | C09K/5/04 |

* cited by examiner

Primary Examiner—Yogendra N. Gupta
Assistant Examiner—Eisa B Elhilo
(74) Attorney, Agent, or Firm—Beyer Weaver & Thomas LLP

(57) ABSTRACT

A refrigerant composition comprising a hydrofluorocarbon component including 1,1,1,2-tetrafluoroethane (HFC 134a), the composition further comprising an additive selected from a saturated hydrocarbon or mixture thereof boiling in the range −5 to +70° C.

13 Claims, 2 Drawing Sheets

CFC 12 REPLACEMENT REFRIGERANT

Figure 1:
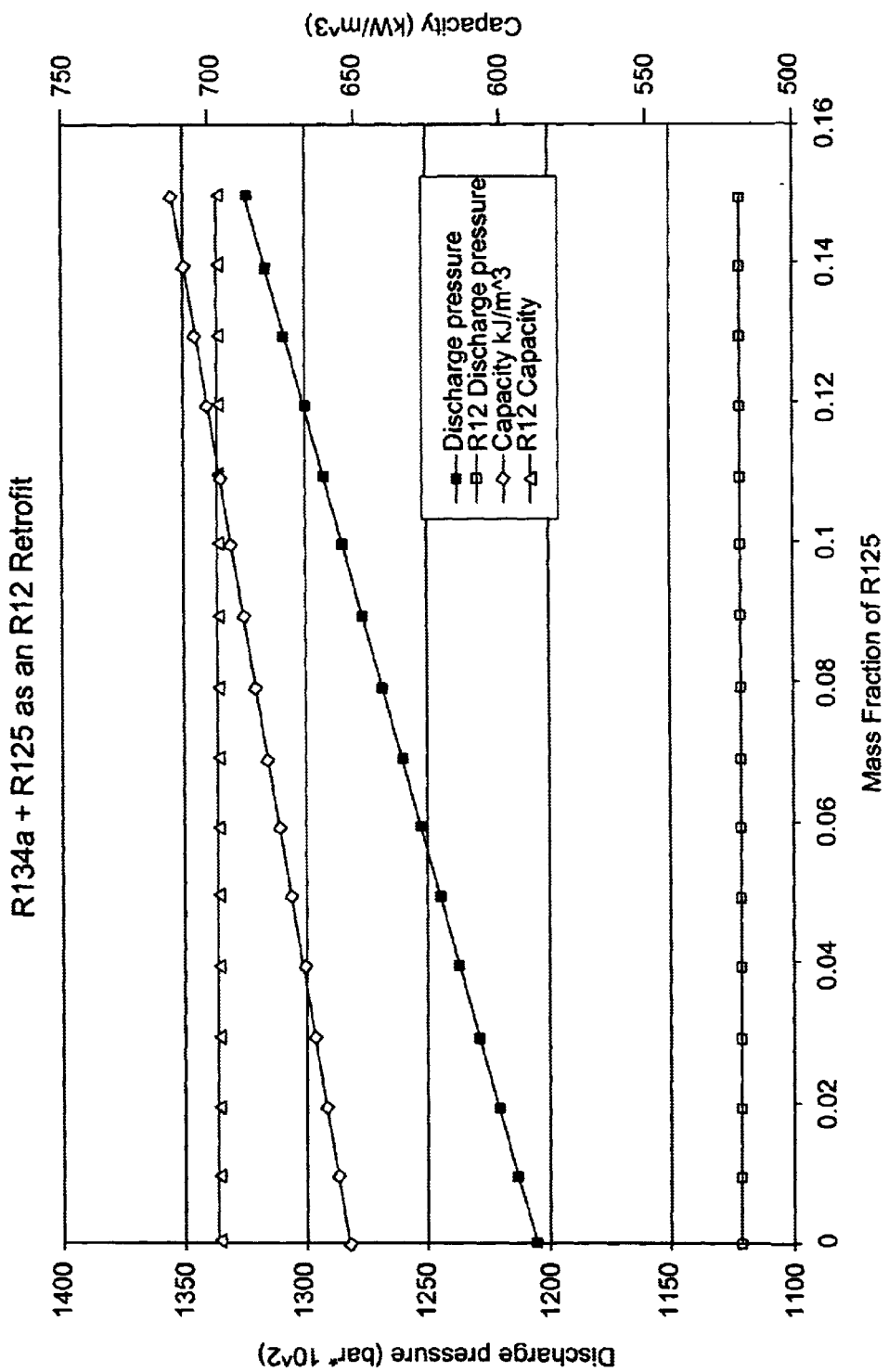
Figure 2:
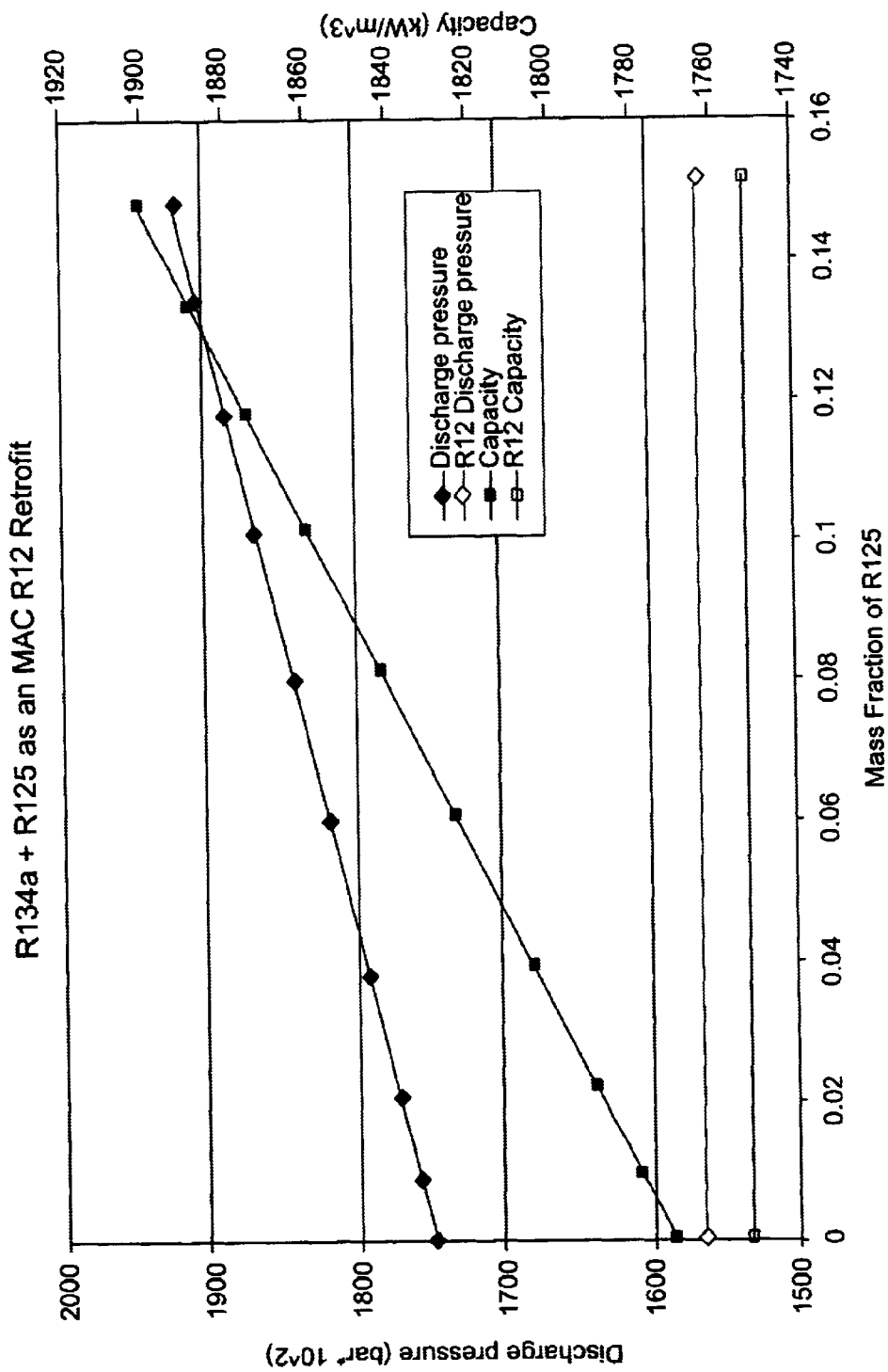

This is a continuation-in-part application of prior application Ser. Nos. 09/565,186 filed on May 3, 2000, and 09/570,829 filed on May 12, 2000 now abandoned which both claim priority of Provisional Application No. 60/157,692 filed on Oct. 4, 1999.

This invention relates to a refrigerant particularly but not exclusively for air conditioning systems. The system relates especially to refrigerant compositions which have no adverse effect on the atmospheric ozone layer and to compositions which can be added to existing refrigerants which are compatible with lubricants commonly used in refrigeration and air conditioning systems. The invention also relates to a method of modifying refrigeration and air conditioning systems.

Chlorofluorocarbons (CFCs) eg CFC 11 and CFC 12 are stable, of low toxicity and non-flammable providing low hazard working conditions used in refrigeration and air conditioning systems. When released they permeate into the stratosphere and attack the ozone layer which protects the environment from damaging effects of ultraviolet rays. The Montreal Protocol, an International environmental agreement signed by over 160 countries, mandates the phase-out of CFCs according to an agreed timetable. This now includes hydrochlorofluorocarbons (HCFCs) which also have an adverse effect on the ozone layer.

Any replacement for CFC 12 must have no ability to deplete ozone. The compositions of the present invention do not include chlorine atoms and consequently they will have no deleterious effect on the ozone layer while providing a similar performance as a working fluid to CFC 12 in refrigeration apparatus.

Various terms have been used in patent literature to describe refrigerant mixtures. These may be defined as follows:

Zeotrope: A fluid mixture whose vapour and liquid compositions are different at a specified temperature.

Temperature glide: If a zeotropic liquid is distilled at constant pressure its boiling point will increase. The change in boiling point from the beginning of the distillation until the point when a liquid phase has just disappeared is called the temperature glide. A glide is also observed when the saturated vapour of a zeotrope is condensed at constant pressure.

Azeotrope: A fluid mixture of specified composition whose vapour and liquid compositions are the same at a specified temperature. Strictly speaking a fluid mixture which is an azeotrope under for example evaporator conditions, cannot also be an azeotrope under the condenser conditions. However the refrigeration literature may describe a mixture as azeotropic provided that it meets the above definition at some temperature within its working range.

Near-azeotropes: A blend which boils over a small temperature range, that has a small temperature glide.

Retrofit refrigerant mixture: A non-chlorine-containing mixture used to replace completely the original CFC or HCFC refrigerant.

Extender refrigerant mixture: A non-chlorine-containing mixture added during servicing to the CFC or HCFC refrigerant remaining in a unit, that is a top up refrigerant to make good any leakage.

Hermetic compressor: A compressor when the electric motor is in the same totally welded casing as the compressor. The motor is cooled by the refrigerant vapour returning to the compressor. The heat generated by the motor is removed through the condenser.

Semi-hermetic compressor: Similar to a hermetic compressor, the major difference being the casing has a bolted joint which can be opened to enable the motor and compressor to be serviced.

Open compressor: A compressor which is driven by an external motor via a drive shaft passing through the compressor casing. The motor heat is dissipated directly to the environment, not via the condenser. This results in a slightly more efficient performance than a hermetic compressor, but refrigerant leaks can occur at the shaft seal.

Percentages and proportions referred to in this specification are by weight unless indicated otherwise. Percentages and proportions are selected to total 100%.

According to a first aspect of the present invention a refrigerant composition comprises 1,1,1,2-tetrafluoroethane (R 134a), pentafluoroethane (R125) and an additive selected from a saturated hydrocarbon or mixture thereof boiling in the range −5 to +70° C.; wherein the weights of R 125 to R 134a are in the range

| R 125 | 1–17% |
|---|---|
| R 134a | 99–83% |

The preferred weights of R 125 and R134a are in the ranges

| R 125 | 2–15% |
|---|---|
| R 134a | 98–85% |

Positive displacement compressors, that is reciprocating or rotary compressors, used in refrigeration systems suck in small amounts of lubricant from the crank case which are ejected with the refrigerant vapour through the exhaust valves. In order to maintain compressor lubrication this oil must be forced around the circuit by the refrigerant stream and returned to the crank case. CFC and HCFC refrigerants are miscible with hydrocarbon oils and hence carry the oils around the circuit. However HFC refrigerants and hydrocarbon lubricants have low mutual solubilities so effective oil return may not occur. The problem is particularly acute in evaporators where low temperatures can increase the viscosities of oils sufficiently to prevent them being carried along the tube walls. With CFCs and HCFCs enough refrigerant remains in the oil to reduce the viscosities to enable oil return to occur.

When using HFCs with hydrocarbon lubricants oil return can be facilitated by introducing into the system a hydrocarbon fluid having the following properties:

(a) sufficient solubility in the lubricant at the evaporator temperature to reduce its viscosity; and (b) sufficient volatility to allow distillation from the hot lubricant in the compressor crank case.

Hydrocarbons fulfil these requirements.

Preferred hydrocarbons additives are selected from the group consisting of: 2-methylpropane, 2,2-dimethylpropane, butane, pentane, 2-methylbutane, cyclopentane, hexane, 2-methylpentane, 3-methylpentane, 2,2-dimethylbutane and methylcyclopentane. Use of n-pentane, cyclopentane, isopentane and mixtures thereof is preferred. Use of n-pentane or isopentane or mixtures thereof is especially preferred.

In particularly preferred embodiments of the invention a mixture of pentane, preferably n-pentane, isopentane or a mixture thereof together with butane is employed. This provides the advantage that a close boiling or near azeotropic blend may be obtained so that formation of a flammable high proportion of pentane is avoided in the event of leakage, for example from a storage cylinder.

The amount of hydrocarbon additive may be up to 10%, preferably 1 to 8% and more preferably about 2–4%. The amount of R 125 may be increased with increasing amounts of the hydrocarbon additive.

Relative proportions of the pentane and butane components may be selected to give a total of 0.2 to 5% of the composition, preferably 2 to 4%, more preferably 3 to 4%. An amount of pentane, preferably isopentane of 0.2 to 2% may be used together with a corresponding amount of 4.8 to 3% of butane in a composition containing a total of 5% hydrocarbon. In compositions with less than 5% hydrocarbon, for example 1% or 4%, relatively larger ratios of butane:pentane may be employed to minimise hydrocarbon build-up on leakage. Flammability risks are therefore reduced.

A particularly preferred composition comprises:

| | |
|---|---|
| R125 | 9.5% |
| R134a | 88.5% |
| Pentane | 2% |

An alternative composition comprises:

| | |
|---|---|
| R125 | 5% |
| Butane/pentane mixture | 3 to 4% |
| R134a | balance to 100% |

A ratio of pentane/butane of 1:3 to 1:8, preferably about 1:5 may be employed.

Refrigerant compositions in accordance with this invention confer several advantages. The presence of R 125 suppresses the flammability of the refrigerant mixture. The higher HFC content enables more pentane to be added to the mixture thereby reducing the solubility properties of the mixture with traditional lubricants, for example mineral and alkyl benzene oils.

The present invention may confer a number of benefits in comparison to R 12 including lower intrinsic global warming potential and lower discharge temperature. The present invention may confer a number of benefits in comparison to pure R 134a including greater miscibility and higher capacity with hydrocarbon oil and hence better oil return.

The invention is further described by means of examples but not in any limitative sense.

EXAMPLE 1

R125/R134a/pentane compositions were evaluated using standard refrigeration cycle analysis techniques to assess their suitabilities as retrofits for R12 in hermetic or semi-hermetic systems. The operating conditions selected for the analysis are typical of those conditions found in refrigeration systems. Since the blends were, strictly speaking, zeotropes the midpoints of their temperature glides in the evaporator and condenser were chosen to define the temperature limits of the cycle. The same temperatures were also used to generate performance data for R12.

The pentane was present at 4% by weight based on the total weight of the R125/R134a blend. To simplify the calculation this small amount of pentane was omitted.

Compositions containing 1 and 15% R125 were considered.

The following cycle conditions were used in the analysis:

Evaporator

| | |
|---|---|
| Midpoint fluid evaporation temperature | 7.0° C. |
| Superheating | 5.0° C. |
| Suction line pressure drop (in saturated temperature) | 1.5° C. |

Condenser

| | |
|---|---|
| Midpoint fluid condensing temperature | 45.0° C. |
| Subcooling | 5.0° C. |
| Exhaust line pressure drop (in saturated temperature) | 1.5° C. |

Liquid Line/Suction Line Heat Exchanger

| | |
|---|---|
| Efficiency | 0.3 |

Compressor

| | |
|---|---|
| Electric motor efficiency | 0.85 |
| Compressor isentropic efficiency | 0.7 |
| Compressor volumetric efficiency | 0.82 |

Parasitic Power

| | |
|---|---|
| Indoor fan | 0.3 kW |
| Outdoor fan | 0.4 kW |
| Control | 0.1 kW |

The results of anlaysing the performance of an air-conditioning unit using these operating conditions are shown in Table 1 and key parameters plotted in Chart 1.

All blends have lower exhaust temperatures than R12 and therefore meet the requirements of this specification on this account.

The COPs (system) are not less than 97% of that of R12. The cooling capacities of all the compositions are greater than 90% of that of R12 over the whole of the dilution range.

Compositions containing 3% or more R125 have capacities greater than 95% of that of R12. Compositions containing 12% or more of R125 have capacities greater than that of R12.

The discharge pressures do not exceed that of R12 by more than 2 bar for all compositions.

All compositions meet the requirements of this invention. Compositions with 9 to 13% R125 are especially promising, providing a good compromise between discharge pressure and capacity.

EXAMPLE 2

R125/R134a/pentane compositions were evaluated using standard refrigeration cycle analysis techniques to assess their suitabilities as retrofits for R12 in mobile air conditioning systems. The operating conditions selected for the analysis are typical of those conditions found in MAC systems. Since the blends were, strictly speaking, zeotropes the midpoints of its temperature glides in the evaporator and condenser were chosen to define the temperature limits of the cycle. The same temperatures were also used to generate performance data for R12.

The pentane was present at 4% by weight based on the total weight of the R125/R134a blend. To simplify the calculation this small amount of pentane was omitted.

Compositions containing 1 and 17% R125 were considered.

The following cycle conditions were used in the analysis:

Evaporator

| | |
|---|---|
| Midpoint fluid evaporation temperature | 7.0° C. |
| Superheating | 5.0° C. |
| Suction line pressure drop (in saturated temperature) | 1.5° C. |

Condenser

| | |
|---|---|
| Midpoint fluid condensing temperature | 60.0° C. |
| Subcooling | 5.0° C. |
| Exhaust line pressure drop (in saturated temperature) | 1.5° C. |

Compressor

| | |
|---|---|
| Compressor isentropic efficiency | 0.7 |
| Compressor volumetric efficiency | 0.82 |

Parasitic Power

| | |
|---|---|
| Condenser fan | 0.4 kW |

The results of analysing the performance of an air-conditioning unit using these operating conditions are shown in Table 2 and key parameters plotted in Chart 2.

All blends have lower exhaust temperatures than R12 and therefore meet the requirements of this specification on this account.

The cooling capacities of all the compositions are greater than of that of R12 over the whole of the range.

Compositions containing up to 3% of R125 have discharge pressures that do not exceed that of R12 by more than 2 bar.

For high capacities in equipment that can withstand higher pressures 5 to 17% R125 is preferred and especially preferred to 10 to 17%.

If maximum pressure is a concern then blends containing 0 to 3% 125 are preferred which boost capacity but do not exceed the pressure of R12 by more than 2 bar. These blends are near-azeotropic.

EXAMPLE 3

R12 and several R-134a/pentane compositions were evaluated in a typical refrigeration system to assess (a) the minimum amount of pentane required in R-134a to provide proper oil return using mineral oil in the typical refrigeration system operating in medium or high temperature applications; and (b) if the resulting mixture provides coefficients of performance and pressures and temperatures similar to a system operating on R-12.

The refrigeration system used comprised a 0.37 kW type Danfoss model DA05H1AAN air-cooled hermetic compressor with a design evaporation temperature of −6° C. to +10° C. and a capacity of 967 W to 1861 W/hr. The unit was fitted with a tube in tube evaporator and an oil sight glass was fitted to the compressor. The system was charged with 3 G oil (150 viscosity) and was operated as a condensing system to condense R22 vapour from the top of a heated cylinder. The condensate flow was by gravity from the evaporator/condenser to a second unheated cylinder. The system capacity was determined by the weight of R22 condensed during a fixed time period. The flow of R22 vapour to the evaporator/condenser was restricted manually to provide various load conditions. All pressure, temperature capacity and amperage readings were taken hourly and averaged over a six to eight hour period. A connection on the discharge line and evaporator inlet facilitated vapour sampling and allowed addition of graduated amounts of pentane to the system.

The system was charged with 3 Gs oil (150 viscosity). The system was operated as a condensing system to condense R-22 vapours from the top of a heated cylinder and the condensate flowed by gravity from the evaporator/condenser to a second unheated cylinder. The system capacity was determined by the weight of R-22 condensed during a fixed time period. The flow of R-22 vapour to the evaporator/condenser was restricted manually to provide various load conditions.

In stage 1 of the trial, the system was initially operated with a charge of 1.2 kg of R-12. The following data was monitored and recorded—voltage, amperage, suction pressure, suction temperature, discharge pressure, discharge temperature, liquid line temperature, evaporator temperature, ambient temperature, oil level, source and receiving cylinder temperatures and process rates in kg/m. The data was measured hourly and averaged over an 18 hour period. During this time the evaporator temperatures were controlled by restricting the inlet of purge gas and were monitored over a range of temperatures between −34° C. and −6° C.

In stage 2 of the trial, all R-12 was removed from the system leaving the oil in place. This was then replaced with R-134a at approximately 90% of original R-12 charge by weight. The oil level was again recorded. The refrigeration system was then operated for several days and the above data recorded at hourly intervals.

It was noted that after many days of operation at various load conditions the oil level in the compressor did not change.

15 m of suction line was then added to the system, again with no change in oil level. Oil return was then inhibited and after several days of operation the oil level dropped by approx. 10 mm.

Pentane was added to the R-134a to a maximum of 2% of the original charge by weight. After approx. 18 hours the oil level increased by approx 6 mm.

Additional amounts of pentane were later added up to a maximum of 6% of original refrigerant charge with smaller increases in oil level observed with each addition of pentane.

Referring to Table 3 the following observations can be made in respect of stage 2 of the trial (as compared to stage 1).

(a) oil return was improved with the addition of pentane;
(b) capacities were slightly higher under all load conditions;
(c) energy consumption was slightly lower under all load conditions;
(d) discharge pressures were slightly higher on average;
(e) suction pressures were similar on average;
(f) discharge temperatures were slightly higher on average;

(g) suction temperatures were considerably higher on average; and (h) there was no apparent negative impact on the system operation or components.

It was noted that the mixture became flammable in concentrations of 10% or more of pentane based on an open flame test and percentages as determined by gas chromatography area percentage.

Fractionation of the mixture was evident with percentages varying from 1% to 20% of pentane or a mixture of 6% by weight.

It was believed that the pentane may have been concentrated in the compressor crank case oil during the off cycle.

It may be concluded that a mixture of R-134a plus 2% pentane installed as a drop in replacement provided oil return and equal to or better capacity and higher efficiency for a medium or high temperature R-12 commercial system with no immediate negative effects on the equipment or operation. Blends with more than 2% pentane could fractionate to the point of flammability under certain conditions. Systems with large refrigerant oil charges and relatively small compressor crank case oil charges could be susceptible to compressor damage if pentane content in the oil reached concentrations that would affect the lubricity of the oil or cause foaming of the oil on start up after extended shut down periods.

EXAMPLE 4

R-12 and several R134a/pentane mixtures were evaluated using an automotive air conditioning system to determine if the mixture best suited for commercial refrigeration systems as referred to in the previous example could also be used as a drop in replacement for R-12 in automotive air conditioning systems.

The air conditioning system was that of a 1990 Chrysler mini van having a 3.3 liter engine. The existing charge of R-12 in the air conditioning system was recovered and the system evacuated to 300 μm pressure. This was then recharged with 0.82 kg of R-12 as recommended by the vehicle manufacturer. Finally, temperature sensors were installed on the suction line, discharge line, evaporator air outlet and condition space of the system.

In stage 1 of the trial suction pressure, discharge pressure, suction temperature, discharge temperature, evaporator leaving air temperature, condition space temperature, ambient temperature and engine rpm were measured for the system at idle conditions and again at 2000 rpm. All data were recorded with the vehicle stationary.

In stage 2 of the trial R-12 trial was recovered and the system again evacuated to 300 μm pressure. The system was then charged with R-134a and a 2% pentane mixture at volume equal to 90% of the original recommended charge. The same data was recorded as for stage 1 of the trail.

Finally, in stage 3 of the trial the R-134a/pentane mixture was recovered and the system again evacuated to 300 μm pressure. The system was then charged with R-134a (88%)/R-125 (10%)/pentane (2%). The same data was again recorded.

With reference to Table 4 it was seen that in stage 2 (when compared to stage 1)

(a) discharge pressures were on average 8% higher at idle and 4% higher at 2000 rpm;

(b) discharge temperatures were on average 3% lower at idle and 12% lower at 2000 rpm;

(c) other temperature and pressure readings showed no significant change;

(d) there was no apparent loss of capacity in this system; and (e) there was no apparent negative impact on the system operation or components.

With reference to Table 5 it was seen that in stage 3

(a) there was no significant change to the temperatures and pressures when the 10% R-125 was added to the blend; and (b) there was no apparent negative impact on the system operation or components.

EXAMPLE 5

R-12 and several R134a/pentane/R125 mixtures were evaluated using the air conditioning system of a 2 liter 1987 Toyota Camry.

As in Example 4, the existing charge of R-12 was evacuated from the air conditioning system and the pressure of this system reduced to 300 μm. This was then recharged with 0.68 kg of R-12 as recommended by the vehicle manufacturer. The air conditioning system was fitted with temperature sensors on the suction line, discharge line, evaporator air outlet and conditioned space.

In stage 1 of the trial data including suction pressure, discharge pressure, suction temperature, discharge temperature, evaporator leaving air temperature, conditioned space temperature, ambient temperature and engine rpm were measured at idle conditions and again at 2000 rpm. All data was recorded with the vehicle stationary.

In stage 2 of the trial the R-12 was recovered from the system and again evacuated to 300 μm air pressure. The systems was then charged with a mixture of R-134a (88%)/R-125 (10%)/pentane (2%) equal to 90% of the original charge. The same data as in stage 1 was then recorded.

With reference to Table 6 it was seen that in stage 2 (compared to stage 1)

(a) discharge pressures were on average 18% higher at idle conditions and 6% higher at 2000 rpm; and (b) there was no apparent negative impact on the system operation or components.

It was concluded from Examples 4 and 5 that a mixture of R-134a plus 2% pentane installed as a drop in replacement for R-12 in automotive air conditioning systems appears to provide similar capacity and no immediate negative effect on the equipment or operation. The addition of 10% R-125 to the above mixture does not have any significant effect on the previous pressures and temperatures of the system.

EXAMPLE 6

R-12 and several R-134a/pentane/R-125 compositions were evaluated using domestic refrigerator and freezer systems.

In a first trial a domestic refrigeration system was used. The system's specifications are as follows Manufacturer: General Electric Size: 198 cubic liters Kw: 0.1 kw Type: single door, single evaporator with freezer compartment, non-frost-free Age: approx 25 to 30 years Refrigerant charge: 0.128 kg Voltage: 115/1/60

Gauges were installed on the suction and discharge lines. Temperature sensors were attached to suction and discharge lines approx 15 cm from the compressor.

In a first stage the system was operated with the existing R-12 refrigerant charge. The following data were recorded—voltage, amperage, suction pressure, suction temperature, discharge pressure, discharge temperature, space temperature, ambient temperature and compressor run time.

In the second stage the R-12 charge was recovered and the system was evacuated to 300 μm pressure. The system was then recharged with R-134a/pentane (98/2%) mixture with approx 90% by weight of the original charge. The system was again operated and the same data as before recorded.

Finally, in stage 3 the R-134a/pentane mixture was recovered and the system was recharged with R-134a/R-125/pentane (88/10/2%) mixture with the same amount by weight as stage 2. The system was again operated and the same data as above recorded.

The results of these three stages are recorded in Table 6.

In a second trial a domestic freezer was used. The specification of the system are as follows:
Manufacturer: Viking
Size: 482 cubic liters
Kw: 0.2 Kw
Type: Chest type, non-frost-free
Age: Approx 25 to 30 years
Refrigerant charge: 0.434 kg
Voltage: 115/1/60

Gauges were installed on the suction and discharge lines. Temperature sensors were installed on suction and discharge lines approx 15 cm from the compressor.

In a first stage the system was operated with the existing R-12 refrigerant charge and the following data recorded—voltage, amperage, suction pressure, suction temperature, discharge pressure, discharge temperature, space temperature, ambient temperature and compressor run time.

In a second stage the R-12 charge was recovered and the system evacuated to 300 μm pressure. The system was then recharged with R-134a/pentane (98/2%) mixture with approx 90% by weight of the original charge. The system was again operated and the same data as before recorded.

Finally, in stage 3 the R-134a/pentane mixture was recovered and replaced with R-134a/R125/pentane (88/10/2%) mixture with the same amount by weight of approx 2. The system was again operated and the same data recorded.

The data from all three stages is reproduced as Table 7.

With reference to Table 7 it was seen there are no significant changes in operating pressures, temperatures or efficiencies on changing the mixture. There was no apparent negative impact on the system operation or components.

In conclusion, a mixture of R-134a plus 2% pentane installed as a drop in replacement for R-12 domestic refrigerators and freezers appears to provide a similar capacity and no immediate negative effects on the equipment or operation. The addition of 10% R-125 to the above mixture did not have any significant effect on the previous pressures and temperatures or operation of the systems.

EXAMPLE 7

Field test trials were carried out on a commercial refrigeration system using a mixture of R134a/R125/isopentane/butane in the ratio of 95/5/1/2% by weight. The refrigerant mixture was charged into the system and the performance was compared to previous test data. The results are shown in Table 9. The discharge in other pressures and temperatures, capacity and energy usage was similar to those of a blend of R134a/R125/pentane in the ratio 88/10/2%. The oil level remained consistent during the entire test. It was noted that replacing pentane with an isopentane/butane mixture provided the same oil return properties and that reducing the R125 content from 10% to 5% was not detrimental to performance.

TABLE 1

R125/134a as an R12 Retrofit

| Refrigerant % R125 by weight | R12 | 0 | 1 | 2 | 3 | 4 | 5 | 6 | 7 |
|---|---|---|---|---|---|---|---|---|---|
| Discharge pressure (bar) | 11.21 | 12.05 | 12.13 | 12.20 | 12.28 | 12.36 | 12.44 | 12.51 | 12.59 |
| Discharge temperature (° C.) | 127.6 | 118.2 | 118.0 | 117.9 | 117.7 | 117.5 | 117.4 | 117.2 | 117.1 |
| COP (system) | 1.36 | 1.34 | 1.34 | 1.34 | 1.34 | 1.34 | 1.34 | 1.34 | 1.34 |
| Capacity (kW/m$^3$) | 698.2 | 652.7 | 656.5 | 660.3 | 664.2 | 668.0 | 671.9 | 675.9 | 679.8 |
| Glide in evaporator (° C.) | 0 | 0 | 0.08 | 0.18 | 0.26 | 0.35 | 0.44 | 0.52 | 0.61 |
| Glide in condenser (° C.) | 0 | 0 | 0.12 | 0.24 | 0.35 | 0.47 | 0.58 | 0.69 | 0.80 |

| Refrigerant % R125 by weight | 8 | 9 | 10 | 11 | 12 | 13 | 14 | 15 |
|---|---|---|---|---|---|---|---|---|
| Discharge pressure (bar) | 12.67 | 12.75 | 12.83 | 12.91 | 12.99 | 13.07 | 13.15 | 13.24 |
| Discharge temperature (° C.) | 116.9 | 116.8 | 116.4 | 116.4 | 116.2 | 116.1 | 115.9 | 115.8 |
| COP (system) | 1.33 | 1.33 | 1.33 | 1.33 | 1.33 | 1.33 | 1.33 | 1.33 |
| Capacity (kW/m$^3$) | 683.8 | 687.8 | 691.9 | 695.9 | 700.0 | 704.1 | 708.3 | 712.4 |
| Glide in evaporator (° C.) | 0.69 | 0.77 | 0.85 | 0.93 | 1.01 | 1.09 | 1.17 | 1.25 |
| Glide in condenser (° C.) | 0.90 | 1.00 | 1.10 | 1.20 | 1.30 | 1.39 | 1.48 | 1.56 |

TABLE 2

R125/134a as an MAC R12 Retrofit

| Refrigerant % R125 by weight | R12 | 0 | 1 | 3 | 5 | 7 | 9 | 11 | 13 | 15 | 17 |
|---|---|---|---|---|---|---|---|---|---|---|---|
| Discharge pressure (bar) | 15.72 | 17.42 | 1752 | 17.72 | 17.93 | 18.14 | 18.36 | 18.57 | 18.79 | 19.01 | 19.24 |
| Discharge temperature (° C.) | 88.4 | 84.4 | 84.4 | 84.3 | 84.3 | 84.3 | 84.2 | 84.2 | 84.1 | 84.1 | 84.0 |

TABLE 2-continued

R125/134a as an MAC R12 Retrofit

| Refrigerant<br>% R125 by weight | R12 | 0 | 1 | 3 | 5 | 7 | 9 | 11 | 13 | 15 | 17 |
|---|---|---|---|---|---|---|---|---|---|---|---|
| COP (system) | 2.45 | 2.38 | 2.37 | 2.34 | 2.36 | 2.36 | 2.35 | 2.34 | 2.34 | 2.33 | 2.32 |
| Capacity (kW/m$^3$) | 1754 | 1771 | 1779 | 1794 | 1809 | 1824 | 1840 | 1856 | 1871 | 1887 | 1902 |
| Glide in evaporator (° C.) | 0 | 0 | .08 | 0.22 | 0.37 | 0.51 | 0.65 | 0.78 | 0.91 | 1.00 | 1.18 |
| Glide in condenser (° C.) | 0 | 0 | 0.10 | 0.30 | 0.50 | 0.68 | 0.85 | 1.02 | 1.17 | 1.32 | 1.46 |

TABLE 3

R-12 versus R-134a/Pentane Mixtures Commercial Refrigeration System

|  | R-12 | R-134a + 2% | R-134a + 4% | R-134a + 6% |
|---|---|---|---|---|
| HIGH LOAD CONDITIONS | | | | |
| Suction Pressure | 1.72 | 1.59 | 1.79 | 1.59 |
| Suction Temp | 6 | 14 | 13 | 16 |
| Discharge Pressure | 8.4 | 8.7 | 8.4 | 9 |
| Discharge Temp | 59 | 59 | 60 | 63 |
| Capacity | 0.3 | 0.32 | 0.3 | 0.29 |
| Ambient Temp | 24 | 21 | 21 | 26 |
| Amperage | 9.96 | 9.58 | 10.5 | 10.8 |
| MEDIUM LOAD CONDITIONS | | | | |
| Suction Pressure | 0.69 | 0.83 | 0.69 | 0.83 |
| Suction Temp | 0 | 14 | 13 | 17 |
| Discharge Pressure | 7.5 | 7.8 | 7.5 | 7.8 |
| Discharge Temp | 56 | 57 | 58 | 59 |
| Capacity | 0.14 | 0.15 | 0.14 | 0.17 |
| Ambient Temp | 25 | 22 | 24 | 26 |
| Amperage | 9.14 | 8.78 | 9.8 | 10.04 |
| LOW LOAD CONDITIONS | | | | |
| Suction Pressure | −0.1 | 0 | 0.1 | 0 |
| Suction Temperature | .17 | 16 | 19 | 20 |
| Discharge Pressure | 5.8 | 6 | 7 | 6.4 |
| Discharge Temp | 42 | 46 | 47 | 49 |
| Capacity | 0.05 | 0.05 | 0.05 | 0.04 |
| Ambient Temp | 21 | 21 | 26 | 25 |
| Amperage | 8.7 | 8.14 | 9.43 | 9.25 |

Pressures are in Bars
Temperatures are in Celsius
Capacity is in Kg/min

TABLE 4

R-12 versus R-134a + 2% Pentane
Automotive A/C Application
Vehicle #1 1990 Chrysler Mini-Van

|  | R-12 | | R-134a + 2% Pentane | |
|---|---|---|---|---|
|  | 1000 rpm | 2000 rpm | 1000 rpm | 2000 rpm |
| Suction Press | 1.72 | 1.52 | 2.21 | 1.52 |
| Suction Temp | 17 | 14 | 21 | 12 |
| Discharge Press | 12.8 | 14.1 | 13.8 | 14.7 |
| Discharge Temp | 74 | 89 | 72 | 78 |
| Supply Air Temp | 4 | 3 | 5 | 3 |
| Space Temp | 18 | 16 | 18 | 16 |
| Ambient Temp | 27 | 27 | 25 | 25 |

Pressures are in Bars
Temperatures are in Celsius
Vehicle Stationary

TABLE 5

R-134a + Pentane versus R-134a + R125 + Pentane
Automotive A/C Application
Vehicle #1 1990 Chrysler Mini-Van

|  | R-134a + 2% Pentane | | R-134a + R-125 +Pentane | |
|---|---|---|---|---|
|  | 1000 rpm | 2000 rpm | 1000 rpm | 2000 rpm |
| Suction Press | 1.38 | 1.38 | 1.53 | 1.5 |
| Suction Temp | 8 | 10 | 10 | 12 |
| Discharge Press | 13.62 | 13.03 | 13.62 | 13.62 |
| Discharge Temp | 71 | 80 | 69 | 74 |
| Supply Air Temp | 12 | 13 | 12 | 13 |
| Space Temp | 12 | 13 | 12 | 13 |
| Ambient Temp | 9 | 9 | 10 | 10 |

Pressures are in Bars
Temperatures are in Celsius
Vehicle Stationary

TABLE 6

R-12 versus R-134a/R-125/Pentane (88/10/2%)
Automotive A/C Application
Vehicle #2 1987 Toyota Camry

|  | R-12 | | R-134a/R-125/Pentane | |
|---|---|---|---|---|
|  | 1000 rpm | 2000 rpm | 1000 rpm | 2000 rpm |
| Suction Press | 1.33 | 1.24 | 1.38 | 1.19 |
| Suction Temp | −3 | −5 | 0 | −3 |
| Discharge Press | 8.39 | 11.03 | 9.88 | 11.72 |
| Discharge Temp | 47 | 69 | 49 | 78 |
| Supply Air Temp | 4 | 5 | 5 | 3 |
| Space Temp | 9 | 7 | 7 | 7 |
| Ambient Temp | 9 | 11 | 10 | 10 |

Pressures are in Bars
Temperatures are in Celsius
Vehicle Stationary

TABLE 7

R-12 Replacement Test Results
Domestic Refrigerator

|  | R-12 100% | R-134a/pentane 98/2% | R-134a/R-125/pentane 88/10/2% |
|---|---|---|---|
| Suction Press | 0.34 | 0.21 | 0.21 |
| Suction Temp | 22 | 20 | 17 |
| Discharge Press | 8.5 | 8.2 | 8.33 |
| Discharge Temp | 63 | 60 | 56 |
| Space Temp | 3 | 3 | 1 |
| Ambient Temp | 27 | 24 | 22 |
| Amperage | 1.49 | 1.47 | 1.37 |
| Voltage | 118 | 117 | 118 |
| Run Time/24 Hours | 12.34 | 10.64 | 12.98 |

Pressures are in Bars
Temperatures are in Celsius

TABLE 8

R-12 Replacement Test Results
Domestic Freezer

|  | R-12 100% | R-134a/pentane 98/2% | R-134a/R-125/pentane 88/10/1 |
|---|---|---|---|
| Suction Press | 0.17 | 0.12 | 0.17 |
| Suction Temp | 17 | 16 | 12 |
| Discharge Press | 9.24 | 9.1 | 9.8 |
| Discharge Temp | 60 | 53 | 57 |
| Space Temp | −17 | −19 | −15 |
| Ambient Temp | 25 | 22 | 22 |
| Amperage | 3.72 | 3.37 | 3.74 |
| Voltage | 117 | 117 | 118 |
| Run Time/24 Hours | 13.92 | 12.93 | 13.27 |

Pressures are in Bars
Temperatures are in Celsius

TABLE 9

R-12 vs. R-134a/pentane vs. R-134a/r-125/pentane and r-134a/r-125/isopentane/butane
Commercial Refrigeration System

|  | R-12 | BLEND 1 R-134A/ PENTANE | BLEND 2 R-134A/R-125 PENTANE | BLEND 3 R-134A/R-125/ ISOPENTANE/ BUTANE |
|---|---|---|---|---|
| WT % COMPOSITION | 100% | 98/2% | 88/10/2% | 92/5/1/2% |
| HIGH LOAD COND. | | | | |
| SUCTION PRESSURE | 1.72 | 1.59 | 1.55 | 1.72 |
| SUCTION TEMP. | 6 | 14 | 14 | 12.8 |
| DISCHARGE PRESSURE | 8.4 | 8.7 | 9.06 | 9.31 |
| DISCHARGE TEMP. | 59 | 59 | 60 | 61 |
| CAPACITY | 0.3 | 0.32 | 0.32 | 0.31 |
| AMBIENT TEMP. | 24 | 21 | 19 | 20 |
| AMPERAGE | 9.96 | 9.58 | 10.4 | 10.13 |
| MEDIUM LOAD COND. | | | | |
| SUCTION PRESSURE | .69 | .83 | .67 | 0.63 |
| SUCTION TEMP | 0 | 14 | 11 | 12 |
| DISCHARGE PRESSURE | 7.5 | 7.8 | 7 | 7.6 |
| DISCHARGE TEMP. | 55 | 57 | 58 | 57 |
| CAPACITY | 0.14 | 0.15 | 0.16 | 0.17 |
| AMBIENT TEMP. | 25 | 22 | 19 | 20 |
| AMPERAGE | 9.14 | 8.78 | 9.48 | 9.21 |
| LOW LOAD COND. | | | | |
| SUCTION PRESSURE | −0.1 | 0 | 0 | 0 |
| SUCTION TEMP. | −17 | 16 | 16 | 16 |
| DISCHARGE PRESSURE | 5.8 | 6 | 6.4 | 7.2 |
| DISCHARGE TEMP. | 42 | 46 | 47 | 49 |
| CAPACITY | 0.05 | 0.05 | 0.06 | 0.07 |
| AMBIENT TEMP | 21 | 21 | 20 | 22 |
| AMPERAGE | 8.7 | 8.14 | 9.05 | 9.03 |

Pressures are in bars
Temperatures are in celsius
Capacity is in kg/min.

What I claim is:

1. A refrigerant composition comprising a hydrofluorocarbon component including 1,1,1,2-tetrafluoroethane (R 134a), pentafluoroethane (R 125) and an additive selected from a saturated hydrocarbon or mixture thereof boiling in the range −5 to +70° C., wherein the weights of R 125 and R134a are in the range:

| R 125 | 1–17% |
|---|---|
| R 134a | 99–83%. |

2. A refrigerant composition as claimed in claim 1, wherein the weights are in the ranges:

| R 125 | 2–15% |
|---|---|
| R 134a | 98–85%. |

3. A refrigerant composition as claimed in claim 2, wherein the weights are in the ranges:

| R 125 | 9–13% |
|---|---|
| R 134a | 91–87%. |

4. A refrigerant composition as claimed in claim 3, wherein the hydrocarbon additive is selected from the group consisting of: 2-methylpropane, 2,2-dimethylpropane, n-butane, n-pentane, 2-methylbutane, cyclopentane, hexane, 2-methylpentane, 3-methylpentane, 2,2-dimethylbutane methylcyclopentane and mixtures thereof.

5. A refrigerant composition as claimed in claim 4, wherein the hydrocarbon additive is selected from the group consisting of n-pentane, iso-pentane, cyclopentane and mixtures thereof.

6. A refrigerant composition as claimed in claim 5, wherein the hydrocarbon additive is n-pentane.

7. A refrigerant composition as claimed in claim 6, wherein the hydrocarbon additive further comprises butane.

8. A refrigerant composition as claimed in claim 7, wherein the ratio of pentane:butane is 1:3 to 1:8.

9. A refrigerant composition as claimed in claim 1, wherein the amount of hydrocarbon additive is up to 10%.

10. A refrigerant composition as claimed in claim 9, wherein the amount of hydrocarbon additive is 1 to 8%.

11. A refrigerant composition as claimed in claim 10, wherein the amount of hydrocarbon additive is 2 to 4%.

12. A refrigerant composition as claimed in claim 8, wherein the ratio of pentane:butane is 1:5.

13. A method of refrigeration comprising condensing and evaporating a composition as claimed in claim 1.

* * * * *